US008732863B2

(12) United States Patent
Hines et al.

(10) Patent No.: US 8,732,863 B2
(45) Date of Patent: May 27, 2014

(54) FIBER BLENDS FOR GARMENTS WITH HIGH THERMAL, ABRASION RESISTANCE, AND MOISTURE MANAGEMENT PROPERTIES

(75) Inventors: Robert Hines, Columbus, GA (US); James Bailey, Fortson, GA (US); Leslie Gene Cone, Columbus, GA (US)

(73) Assignee: Drifire, LLC, Columbus, GA (US)

( * ) Notice: Subject to any disclaimer, the term of this patent is extended or adjusted under 35 U.S.C. 154(b) by 5 days.

(21) Appl. No.: 13/695,321

(22) PCT Filed: Apr. 28, 2011

(86) PCT No.: PCT/US2011/034265
§ 371 (c)(1),
(2), (4) Date: Oct. 30, 2012

(87) PCT Pub. No.: WO2011/137213
PCT Pub. Date: Nov. 3, 2011

(65) Prior Publication Data
US 2013/0042385 A1    Feb. 21, 2013

Related U.S. Application Data

(60) Provisional application No. 61/329,876, filed on Apr. 30, 2010.

(51) Int. Cl.
*A41D 3/02* (2006.01)
*A41D 31/00* (2006.01)
*A62B 17/00* (2006.01)
*A41D 1/00* (2006.01)
*D03D 15/12* (2006.01)

(52) U.S. Cl.
CPC .......... *A41D 31/0022* (2013.01); *A62B 17/003* (2013.01); *D03D 15/12* (2013.01); *Y10S 428/921* (2013.01)
USPC ...................... 2/81; 2/69; 2/93; 2/97; 428/921

(58) Field of Classification Search
CPC ......... D02G 3/443; D02G 3/047; D02G 3/04; D02G 3/441; D02G 3/442; D02G 3/00; D10B 2331/021; D10B 2321/101; D10B 2201/20; D10B 2211/02; D10B 2501/04; D10B 2201/02; D10B 2201/28; D10B 2331/02; D10B 2501/00; D10B 2201/00; D10B 2401/02; D10B 2401/021; D10B 2401/022; D10B 2401/16; D10B 2201/22; D03D 15/12; D03D 1/0041; D03D 15/00; D03D 1/0047; D03D 1/0035; D03D 15/0005; D03D 15/0027; A41D 31/0022; A41D 31/0027; A41D 2400/22; A41D 31/0072; A41D 1/02; A41D 1/06; A41D 2500/10; A41D 27/00; A41D 31/0016; A41D 31/0038;
A41D 31/0088; A41D 31/02; A62B 17/003; A62B 17/00; D01F 1/07; D01F 1/09; D01F 6/40; D01F 8/02; B32B 2307/3065; B32B 2437/00; B32B 5/02; B32B 5/024; D04B 1/14; D04B 21/12; D04B 1/04
See application file for complete search history.

(56) References Cited

U.S. PATENT DOCUMENTS

| | | | | |
|---|---|---|---|---|
| 3,949,124 | A * | 4/1976 | Jilla | 428/96 |
| 4,204,018 | A * | 5/1980 | Bernstein et al. | 442/38 |
| 5,033,262 | A | 7/1991 | Montgomery et al. | |
| 5,888,914 | A * | 3/1999 | Katz | 442/184 |
| 6,381,994 | B1 * | 5/2002 | Lee | 66/196 |
| 6,410,140 | B1 | 6/2002 | Land et al. | |
| 6,845,638 | B2 * | 1/2005 | Ogata | 66/169 R |
| 7,043,942 | B2 * | 5/2006 | Chapman | 66/177 |
| 7,565,920 | B2 * | 7/2009 | Li et al. | 139/420 A |
| 7,678,718 | B2 * | 3/2010 | Harris et al. | 442/310 |
| 7,680,638 | B2 * | 3/2010 | Kim et al. | 703/6 |
| 7,786,031 | B2 * | 8/2010 | Fang et al. | 442/136 |
| 2005/0229327 | A1 * | 10/2005 | Casella et al. | 8/115.51 |
| 2009/0094726 | A1 * | 4/2009 | Grilliot et al. | 2/81 |
| 2011/0250810 | A1 * | 10/2011 | Zhu | 442/199 |
| 2012/0146784 | A1 * | 6/2012 | Hines et al. | 340/539.11 |

FOREIGN PATENT DOCUMENTS

| | | |
|---|---|---|
| EP | 1743962 | 1/2007 |
| EP | 1798318 | 6/2007 |
| WO | 2005090660 | 9/2005 |
| WO | 2008027454 | 3/2008 |
| WO | 2009026481 | 2/2009 |
| WO | 2011137213 | 11/2011 |

OTHER PUBLICATIONS

International Patent Application No. PCT/US2011/034265, "International Search Report and Written Opinion", mailed Mar. 2, 2012 (10 pages).
International Patent Application No. PCT/US2011/034265, International Preliminary Report on Patentability, mailed Nov. 15, 2012; 7 pages.

* cited by examiner

*Primary Examiner* — Bobby Muromoto, Jr.
(74) *Attorney, Agent, or Firm* — Ballard Spahr LLP

(57) ABSTRACT

Fiber blends useful for garments with a balance of high thermal, abrasion resistance, and moisture management properties are disclosed. The fiber blends comprise a hydrophobic fiber component, a hydrophilic fiber component, a structural fiber component, and an optional antistatic fiber. Yarns, fabrics, and garments comprising the fiber blends are also disclosed. Such garments are particularly useful for occupations requiring high thermal properties and abrasion resistance, such as fire fighters, utility workers, and military personnel, without compromising comfort of the wearers by maintaining breathability and moisture management properties of the fabric.

38 Claims, No Drawings

FIBER BLENDS FOR GARMENTS WITH HIGH THERMAL, ABRASION RESISTANCE, AND MOISTURE MANAGEMENT PROPERTIES

CROSS REFERENCE TO RELATED APPLICATIONS

This application is a U.S. national phase patent application under 35 U.S.C. 371 of International Patent Application No. PCT/US2011/034265 entitled "Fiber Blends for Garments with High Thermal, Abrasion Resistance, and Moisture Management Properties" filed Apr. 28, 2011, which claims benefit of priority under PCT Article 8 of U.S. Provisional Application No. 61/329,876 filed Apr. 30, 2010, each of which is incorporated herein by reference in its entirety.

FIELD OF THE INVENTION

The present invention generally relates to fiber blends. More particularly, the invention relates to fiber blends used for a balance of high thermal, abrasion resistance, and moisture management properties and to the yarns, fabrics, and garments made from the fiber blends.

BACKGROUND OF THE INVENTION

Flame-resistant fabrics (also variously referred to as "fire-resistant," "flame-retardant," and "fire-retardant" fabrics) are fabrics that, once ignited, tend not to sustain a flame when the source of ignition is removed. Considerable research has been directed toward the development and improvement of flame-resistant fabrics for use in various products, including clothing and bedding. Flame-resistant clothing is often worn by workers involved in activities such as industrial manufacturing and processing (such as oil, gas, and steel industries), fire-fighting, electrical utility work, military work, and other endeavors that entail a significant risk of being exposed to open flame, flash fire, momentary electrical arcs, and/or molten metal splash. Non-flame resistant work clothes can ignite and will continue to burn even after the source of ignition has been removed. Untreated natural fabrics will continue to burn until the fabric is totally consumed and non-flame resistant synthetic fabrics will burn with melting and dripping causing severe contact burns to the skin. the majority of severe and fatal burn injuries are due to the individual's clothing igniting and continuing to burn, not by the exposure itself. The abrasion resistance of protective fabrics is also an important performance property, as garments which develop failures, such as holes and rips, can compromise the protective properties of the fabric.

Flame-resistant fabrics include both fabrics that are treated to be flame-resistant as well as flame-resistant fabrics made from inherently flame-resistant fibers. The former types of fabrics are not themselves flame-resistant, but are made flame-resistant by applying to the fabric a chemical composition that renders the fabric resistant to flame. These types of fabrics are susceptible to losing their flame-resistance with repeated laundering because the flame-resistant composition tends to wash out. In contrast, inherently flame-resistant fabrics do not suffer from this drawback because they are made from fibers that are themselves flame-resistant. The use of flame resistant clothing provides thermal protection at the exposure area. The level of protection typically rests in the fabric weight and composition. After the source of the ignition is removed, flame resistant garments will self-extinguish, limiting the body burn percentage.

Various types of inherently flame-resistant (FR) fibers have been developed, including modacrylic fibers (e.g., modacrylic fibers sold under the PROTEX name from Kaneka Corporation of Osaka, Japan), aramid fibers (e.g., meta-aramid fibers sold under the NOMEX name and para-aramid fibers sold under the KEVLAR name, both from E.I. Du Pont de Nemours and Company of Wilmington, Del.), FR rayon fibers, oxidized polyacrylonitrile fibers, and others. It is common to blend one or more types of FR staple fibers with one or more other types of non-FR staple fibers to produce a fiber blend from which yarn is spun, the yarn then being knitted or woven into fabrics for various applications. In such a fiber blend, the FR fibers render the blend flame-resistant even though some fibers in the blend may themselves be non-FR fibers, because when the FR fibers combust they release non-combustible gases that tend to displace oxygen and thereby extinguish any flame.

For example, US 2005/0025963 discloses an intimate blend of staple fibers having 10 to 75 parts by weight of at least one aramid fiber, 15 to 85 parts by weight of at least one modacrylic fiber, and 5 to 30 parts by weight of at least one polyamide fiber. Another blend of staple fibers is disclosed in US 2004/0192134, including at least about 60 percent FR fibers (modacrylic and/or aramid) and up to 40 percent synthetic or natural non-FR fibers such as cotton or wool. U.S. Pat. No. 6,787,228 discloses a yarn formed of a blend of fibers including at least about 70 percent modacrylic fibers combined with at least about 3 percent high-performance, high-energy-absorptive fibers such as aramid.

ASTM F1930-99 is a full-scale mannequin test designed to test fabrics in completed garment form in a simulated flash fire. A mannequin, with up to 122 heat sensors spaced around its body, is dressed in the test garment, and then exposed to a flash fire for a pre-determined length of time. Tests are usually conducted at heat energies of 1.8-2 cal/cm$^2$sec, and for durations of 2.5 to 5.0 seconds for single layer garments. Results are reported in percentage of body burn. For consistency in data and accuracy of comparison, the test method defines a standard garment size and configuration that must be used on each test.

In addition to the above-noted performance specifications of fabrics, other properties are also important if a fabric is to be practical and commercially viable, particularly for clothing. For instance, the fabric should be durable under repeated industrial launderings and should have good abrasion-resistance. Furthermore, the fabric should be comfortable to wear. Unfortunately, many of the FR blends are not comfortable under typical environmental conditions. In such cases, wearers tend to be less likely to be compliant and thereby decreasing the probability that the wearer will continue to use the garment as intended. Thus, it is beneficial if an FR fabric exhibits good moisture management properties, i.e., ability to wick away sweat and dry quickly so that the wearer does not become overheated or chilled, and/or the fabric does not irritate the wearer's skin.

There exists a need for a fiber blend that is not only fire-resistant but also provides superior moisture management properties and strength properties to ensure wearer compliance. The fiber blends, fabrics, and garments of the present invention are directed toward these, as well as other, important ends.

SUMMARY OF THE INVENTION

The invention relates generally to fiber blends and to fabrics and garments comprising the fiber blends that achieve a balance of high thermal properties and moisture management properties to provide both protection and comfort to the wearer.

Accordingly, in one embodiment, the invention is directed to fiber blends, comprising:

about 30-70%, by weight, based on the total weight of the fiber blend, of a hydrophobic fiber component comprising at least one polymer selected from the group consisting of modacrylic, fluoropolymer, polybenzimidazole (PBI), and copolymers thereof, and combinations thereof;

about 15-45%, by weight, based on the total weight of the fiber blend, of a hydrophilic fiber component comprising at least one polymer selected from the group consisting of cellulose, cellulose derivatives, wool, and copolymers thereof, and combinations thereof;

about 10-30%, by weight, based on the total weight of the fiber blend, of at least one structural fiber component comprising at least one polymer selected from the group consisting of aramid fiber, melamine fiber, nylon fiber, structural carbon fiber, and combinations thereof, wherein said aramid polymer is present at a level of at least about 10%, by weight, based on the total weight of the fiber blend; and optionally, about 0.1-3% by weight, based on the total weight of the fiber blend, of at least one antistatic fiber.

In other embodiments, the invention is directed to yarns comprising the fiber blends described herein.

In other embodiments, the invention is directed to fabrics comprising the fiber blends described herein.

In yet other embodiments, the invention is directed to garments, especially outerwear, comprising the fabric formed from the fiber blends described herein.

DETAILED DESCRIPTION OF THE INVENTION

As employed above and throughout the disclosure, the following terms, unless otherwise indicated, shall be understood to have the following meanings.

As used herein, the singular forms "a," "an," and "the" include the plural reference unless the context clearly indicates otherwise.

As used herein, the term "about," when referring to a measurable value such as an amount, a temporal duration, and the like, is meant to encompass variations of ±20%, preferably ±10%, more preferably ±5%, even more preferably ±1%, and yet even more preferably ±0.1% from the specified value, as such variations are appropriate to perform the disclosed methods.

As used herein with reference to fabric, the term "formed substantially of" means that the fabric includes at least 50% by weight, based on the total weight of the fabric, preferably at least 75% by weight, based on the total weight of the fabric, and more preferably at least 95% by weight, based on the total weight of the fabric of a specific fiber blend or yarn composition.

As used herein, the term "modacrylic fiber" refers to a acrylic synthetic fiber made from a polymer comprising primarily residues of acrylonitrile, especially polymers that have between 35 to 85% acrylonitrile units, and which may be modified by other monomers. Modacrylic fibers are spun from an extensive range of copolymers of acrylonitrile. The modacrylic fiber may contain the residues of other monomers, including vinyl monomer, especially halogen-containing vinyl monomers, such as but not limited to vinyl chloride, vinylidene chloride, vinyl bromide, vinylidene bromide, and the like. The types of modacrylic fibers that can be produced within this broad category are capable of wide variation in properties, depending on their composition. Some examples of commonly available modacrylics are PROTEX™, KANEKALON™, and KANECARON™ by Kaneka Corporation. Modacrylic fibers have excellent fire retardancy performance combined with non-melt, non-drip and self-extinguishing properties. These are critically important attributes in many working environments. If sufficiently high temperatures are reached on exposure to fire or explosion, a garment made with the inventive fiber blends of the invention will carbonize by forming a protective charred barrier. This prevents propagation of flames, thereby protecting the wearer from severe burn injuries. Modacrylics have a high so-called LOI value as compared with other fibers. The LOI represents the minimum oxygen concentration of an $O_2/N_2$ mix required to sustain combustion of a material. The LOI is determined by the ASTM Test D 2862-77. Modacrylics have an LOI value preferably between about 28 and 33 while conventional polyesters have a much lower value of about 20 to 22.

As used herein, the term "fluoropolymer" refers to a fluorocarbon-based polymer with at least one, but preferably multiple, strong carbon-fluorine bonds, including, but not limited to, polytetrafluoroethylene (PTFE), perfluoroalkoxy polymer (PFA), or fluorinated ethylene-propylene (FEP).

As used herein, the term "aramid fiber" refers to a manufactured fiber in which the fiber-forming substance is a long-chain synthetic polyamide in which at least 85% of the amide linkages, (—CO—NH—), are attached directly to two aromatic rings, including, but not limited to, para-aramid (p-aramid) and meta-aramid (m-aramid). Examples of para-aramids include, but are not limited to, (poly(p-phenylene terephthalamide), e.g., KEVLAR® (E.I. du Pont de Nemours and Company), TWARON® (Teijin Twaron BV), and TECHNORA by Teijin Company. KEVLAR is a para-aramid fiber having a very high tenacity of between 28 and 32 grams/denier and outstanding heat resistance. Examples of meta-aramids include, but are not limited to, (poly(m-phenylene isophthalamide), such as NOMEX® (E.I. du Pont de Nemours and Company) and CONEX® (Teijin Twaron BV). Preferably, the structural fiber is p-aramid, microdenier p-aramid. Such structural fibers feature excellent thermal stability and are virtually non-flammable. These fibers have a very high resistance to heat and are resistant to melting, dripping and burning at a temperature of at least 700° F. Moreover, their LOI value is preferably in the range of between about 28 and about 30.

As used herein, the term "melamine fiber" is a manufactured fiber in which the fiber-forming substance is a synthetic polymer composed of at least 50% by weight of a crosslinked non-thermoplastic melamine polymer of melamine units joined by methylene and dimethylene ether linkages. In the polymerization reaction, methylol derivatives of melamine react with each other to form a three-dimensional structure. This structure is the basis for the fiber's heat stability, solvent resistance, and flame resistance.

As used herein, the term "antistatic fiber" refers to a fiber, when incorporated into a fabric or other material, eliminates or reduces static electricity. Suitable fibers include, but are not limited to, metal fibers (steel, copper or other metal), metal-plated polymeric fibers, and polymeric fibers incorporating carbon black on the surface and/or in the interior of the fiber, such as those described in U.S. Pat. No. 3,803,453, U.S. Pat. No. 4,035,441, U.S. Pat. No. 4,107,129, and the like. Antistatic carbon fiber is a preferred antistatic fiber. One example of such conductive fiber is NEGASTAT® produced by E.I. du Pont de Nemours and Company, a carbon fiber comprising a carbon core of conductive carbon surrounded by non-conductive polymer cover, either nylon or polyester. Another example is RESISTAT® made Shakespeare Conductive Fibers LLC, a fiber where the fine carbon particles are embossed on the surface of a nylon filament. The yarns of both such fibers are available in a denier of at least 40. By way of example, a steel wire is available under the names BEKINOX and BEKITEX from Bekaert S. A. in a diameter as small as 0.035 millimeter. Another antistatic fiber is the product X-static made by Noble Fiber Technologies, a nylon fiber coated with a metal (silver) layer. The X-static fibers may be blended with other fibers, such as modacrylics, in the process of yarn spinning.

As used herein, the term "structural carbon fiber" refers to fibers of about 0.005-0.010 mm in diameter and formed primarily of carbon atoms. The carbon atoms are bonded together in microscopic crystals that are more or less aligned parallel to the long axis of the fiber. Each carbon filament is produced from a precursor polymer. Common precursor polymers include commonly rayon, polyacrylonitrile (PAN), and petroleum pitch. For synthetic polymers such as rayon or PAN, the precursor is first spun into filaments, using chemical and mechanical processes to initially align the polymer atoms in a way to enhance the final physical properties of the completed carbon fiber. After drawing or spinning, the polymer fibers are then heated to drive off non-carbon atoms (carbonization), producing the final carbon fiber. Suitable structural fibers are available from Zoltek, SGL Carbon, Fortafil, Sumitomo, and Kureha Corporation.

As used herein, the term "basis weight" refers to a measure of the weight of a fabric per unit area. Typical units include ounces per square yard and grams per square centimeter.

As used herein, the term "garment" refers to any article of clothing or clothing accessory worn by a person, including, but not limited to shirt, pants, underwear, outer wear, footwear, headwear, swimwear, belts, gloves, headbands, and wristbands.

As used herein, the term "linen" (when not in relation to the hydrophilic fiber) refers to any article used to cover a worker or seating equipment used by workers, including, but not limited to sheets, blankets, upholstery covering, vehicle upholstery covering, and mattress covering.

As used herein, the term "intimate blend," when used in conjunction with a yarn, refers to a statistically random mixture of the staple fiber components in the yarn.

Accordingly, in one embodiment, the invention is directed to fiber blends, comprising:

about 30-70%, by weight, based on the total weight of the fiber blend, of a hydrophobic fiber component comprising at least one polymer selected from the group consisting of modacrylic, fluoropolymer, polybenzimidazole (PBI), and copolymers thereof, and combinations thereof;

about 15-45%, by weight, based on the total weight of the fiber blend, of a hydrophilic fiber component comprising at least one polymer selected from the group consisting of cellulose, cellulose derivatives, wool, and copolymers thereof, and combinations thereof;

about 10-30%, by weight, based on the total weight of the fiber blend, of at least one structural fiber component comprising at least one polymer selected from the group consisting of aramid fiber, melamine fiber, nylon fiber, structural carbon fiber, and combinations thereof; wherein said aramid fiber is present at a level of at least about 10%, by weight, based on the total weight of the fiber blend; and optionally, about 0.1-3% by weight, based on the total weight of the fiber blend, of at least one antistatic fiber.

In certain embodiments, when the fiber blend is formed into a fabric formed substantially of said fiber blend, the fabric provides protection against second and third degree burns on less than about 35% of the wearer, when tested in accordance with the American Society for Testing and Materials Standard Test ASTM F 1930-2000. In preferred embodiments, fabric provides protection against second and third degree burns on less than about 25% of the wearer, when tested in accordance with the American Society for Testing and Materials Standard Test ASTM F 1930-2000. In more preferred embodiments, fabric provides protection against second and third degree burns on less than about 15% of the wearer, when tested in accordance with the American Society for Testing and Materials Standard Test ASTM F 1930-2000.

In certain embodiments, when the fiber blend is formed into a fabric formed substantially of said fiber blend, the fabric has a char length less than about 5 inches, preferably less than about 4 inches, when tested in accordance with the American Society for Testing and Materials Standard Test ASTM 6413.

In certain embodiments, when the fiber blend is formed into a fabric formed substantially of said fiber blend, the fabric has a water vapor transmission of at least about 1100, when tested in accordance with the American Society for Testing and Materials Standard Test ASTM E96 for Water Vapor Transmission, and a vertical wicking of at least about 6 cm/5 minutes, when tested in accordance with Natick Internal Method No. 4.

In certain embodiments, when the fiber blend is formed into a fabric formed substantially of said fiber blend, the fabric has a wet tear value of at least equal to or greater than a corresponding dry tear value, when tested in accordance with the American Society for Testing and Materials Standard Test ASTM D 1424 (condition 1 dry; condition 2 wet).

In certain embodiments, when the fiber blend is formed into a fabric formed substantially of said fiber blend, the fabric has a wet abrasion resistance of greater than about 4000 random abrasion cycles with a 9 KPa load, and greater than about 5,000 dry random abrasion cycles with a 9 KPa load using wet/dry 600 grit ultrafine sandpaper to simulate field usage, when tested in accordance with American Society for Testing and Materials Standard Test ASTM D 4966 Abrasion Resistance of Textile Fabrics—Martindale Abrasion Test Method.

In certain embodiments, when the fiber blend is formed into a fabric formed substantially of said fiber blend, the fabric has a heat and thermal shrinkage resistance value of less than about 5%, when tested in accordance with the National Fire Prevention Association NFPA 1971 and a thermal protective performance value of at least about 5, preferably at least about 5.7 (initial) and at least about 6.7 (after 3× washing), when tested in accordance with the National Fire Prevention Association NFPA 1971 (without spacer).

The hydrophobic fiber component of the fiber blend of the invention is present at a level of about 30-70%, by weight, based on the total weight of the fiber blend, and comprises at least one polymer selected from the group consisting of modacrylic, fluoropolymer, polybenzimidazole (MI), and copolymers thereof, and combinations thereof. In certain embodiments of the fiber blend, the hydrophobic fiber component is present at about 40-60%, by weight, based on the total weight of the fiber blend. In certain other embodiments, the hydrophobic fiber component is present at about 40-50%, by weight, based on the total weight of the fiber blend. In certain embodiments of the fiber blend, the hydrophobic fiber component is modacrylic or copolymer thereof. In other embodiments, the fluoropolymer is selected from the group consisting of polytetrafluoroethylene (PTFE), perfluoroalkoxy polymer (PFA), fluorinated ethylene-propylene (FEP), and mixtures thereof.

The hydrophilic fiber component of the fiber blend of the invention is present at a level of about 15-45%, by weight, based on the total weight of the fiber blend, and comprises at least one polymer selected from the group consisting of cellulose, cellulose derivatives (such as cotton, viscose, linen, rayon, fire-resistant rayon, or a combination thereof), wool, and copolymers thereof, and combinations thereof. In certain embodiments of the fiber blend, the hydrophilic fiber component is present at about 25-40%, by weight, based on the total weight of the fiber blend. In certain other embodiments, the hydrophilic fiber component is present at about 25-35%, by weight, based on the total weight of the fiber blend. In other embodiments, the cellulose derivative is cotton, viscose, linen, rayon, or a combination thereof. A preferred hydrophilic fiber component is cotton or fire-resistant rayon, or a combination thereof.

The structural component of the fiber blend of the invention is present at a level of about 10-30%, by weight, based on the total weight of the fiber blend. The structural fiber component comprises at least one polymer selected from the group consisting of aramid fiber, melamine fiber, nylon fiber, structural carbon fiber, and combinations thereof; wherein said aramid fiber is present at a level of at least about 10%, by weight, based on the total weight of the fiber blend. In certain embodiments of the fiber blend, the structural component is present at about 20-30%, by weight, based on the total weight of the fiber blend. In certain other embodiments, the structural component is present at about 25-30%, by weight, based on the total weight of the fiber blend. In other embodiments, the structural component is aramid fiber, such as m-aramid polymer fiber or p-aramid polymer fiber. In certain embodiments, the aramid fiber is present at a level of about 27-30%, by weight, based on the total weight of the fiber blend. In other embodiments, the structural component is a combination of nylon fiber and aramid fiber, particularly p-aramid fiber. In certain other embodiments, the structural component is a combination of nylon fiber and aramid fiber, particularly p-aramid fiber, where both components are preferably present at a level of about 10%, by weight, based on the total weight of the fiber blend.

In certain embodiments of the fiber blend, an optional antistatic fiber is present at a level of about 0.1-3%, by weight, based on the total weight of the fiber blend. In certain embodiments, the antistatic fiber is an antistatic carbon fiber.

In certain embodiments of the fiber blend,
the hydrophobic fiber component is modacrylic or a copolymer thereof;
the hydrophilic fiber component is cellulose or a cellulose derivative, or a combinations thereof; and
the structural fiber component is aramid fiber, nylon fiber, or a combination thereof.

In certain embodiments, the fiber blend is:
about 30-41%, by weight, based on the total weight of the fiber blend, of modacrylic and copolymers thereof;
about 30-41%, by weight, based on the total weight of the fiber blend, of cotton;
about 27-30%, by weight, based on the total weight of the fiber blend, of para-aramid fiber; and
about 2%, by weight, based on the total weight of the fiber blend, of antistatic carbon fiber.

In certain embodiments, the fiber blend is:
about 50%, by weight, based on the total weight of the fiber blend, of modacrylic and copolymers thereof;
about 30%, by weight, based on the total weight of the fiber blend, of cotton;
about 10%, by weight, based on the total weight of the fiber blend, of nylon fiber; and
about 10%, by weight, based on the total weight of the fiber blend, of para-aramid fiber.

In another aspect, the invention is directed to yarns comprising the various fiber blends described herein, wherein said hydrophobic fiber component, said hydrophilic fiber component, said structural fiber component, and said optional antistatic fiber are intimately blended.

In another aspect, the invention is directed to fabrics formed from the yarns comprising the various blends described herein. The fabrics may be either woven or knitted. In certain embodiments, the fabric has a basis weight of less than about 8.0 ounces/square yard (OPSY). In certain other embodiments, the fabric has a basis weight of less than about 6.0 ounces/square yard (OPSY).

In some embodiments, the fabric may be formed into a garment. In certain embodiments, the fabric forms at least one outer portion of the garment because of the protection it provides. The fabric is useful in garments such as outwear, including, but not limited to coats, coveralls, overalls, shirts, and pants, and is particularly useful in firefighter turnout coats. In other embodiments, the fabric is formed into a garment, such as an undershirt, in a single tubular design to eliminate or reduce the number of seams and failure points.

In other embodiments, linen may be formed from the fabric of the invention.

The present invention is further defined in the following Examples, in which all parts and percentages are by weight, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions.

EXAMPLES

Test Methods

The following test methods were used in the examples, unless otherwise noted.

Heat and Thermal Shrinkage Resistance

This test determines the performance of fabrics when exposed to heat in an oven at 500° F. Observations of ignition, melting, dripping, or separation are recorded and reported for each specimen. The percent change in the width and length direction of the specimen is calculated. Results are recorded and reported as the average of three specimens.

Specimen marking and measurements are conducted in accordance with the procedure specified in AATCC 135 Dimensional Change in Automatic Home Laundering of Woven and Knit Fabrics. The specimen is suspended by metal hooks at the top and centered in the oven so that the entire specimen is not less than 50 mm from any oven surface or other specimen, and air is parallel to the plane of the material. The specimen, mounted as specified, shall be exposed in the test oven for 5 minutes at 500° F.

Flame Resistance of Textiles (Vertical) (ASTM D6413)

This test method determines the response of textiles to a standard ignition source, deriving measurement values for after-flame time, afterglow time, and char length. The vertical flame resistance, as determined by this test method, only relates to a specified flame exposure and application time. This test method maintains the specimen in a static, draft-free, vertical position and does not involve movement except that resulting from the exposure. Test Method D6413 has been adopted from Federal Test Standard No. 191A method 5903.1, which has been used for many years in acceptance testing.

Samples cut from fabric to be tested are mounted in a frame that hangs vertically from inside the flame chamber. A controlled flame is exposed to the sample for a specified period of time. After-flame time, the length of time the material continues to burn after removal of the burner, and after-glow time, the length of time the material glows after the flame extinguishes, are both recorded. Finally, the specimen is torn by use of weights and the char length, the distance from the edge of the fabric that was exposed to the flame to the end of the area affected by the flame, is measured.

Natick Internal Method No. 4 (Drying Time Test Method)
Drying Time Test Method:
1. Fabric samples and blotting paper should be conditioned at 65+/−2% relative humidity and 21+/−1° C. (70+/−2° F.) for a minimum of 4 hours before testing.
2. Test three specimens from each sample. Each specimen consists of a 2"×2" piece cut wearing gloves. The long dimension should be cut parallel to warp direction. Mark each specimen for identification as a part of the sample set.
3. Weigh the conditioned sample using a laboratory balance, accurate to 0.1 g.
4. Place 100 ml of distilled or reverse osmosis water into a 250 ml beaker.
5. Submerge one specimen in the beaker for 30 minutes. Make certain that the specimen is completely submerged under the water to insure complete wetting.
6. Remove the specimen and sandwich it between two pieces of unused blotter paper and pass it through the wringer. Leave the piece sandwiched in the wet blotter paper. Repeat this process for the remaining two specimens of the same sample.
7. Weigh the blotted specimens one at a time.
8. Record the weight as wet weight.
9. Hang each sample separately to dry in a location that is in conditions 65+/−2% relative humidity and 21+/−1° C. (70+/−2° F.).
10. Weigh the samples t the nearest 0.1 g every 5 minutes recording each weight, until completely dry.
11. Repeat until all the specimens return to their original dry weight. At this time, the overall drying time is calculated by averaging the dry time of all three specimens.

Natick Internal Method No. 4 (Vertical Wicking Test)

A 500 ml Erlenmeyer flasks are filled with 200 ml colored water. 6 inch by 1 inch strip are cut from the fabrics to be tested. The top edge of strip is pierced with a long, straight pen. The strip is suspended from pin, in flask filled with 200 ml colored water. At standard intervals, the strip is removed from the flask and water level on the strip is measured and recorded.

AATCC MM TS-05 Gravimetric Drying Test Modified—
Advanced Fabric Drying Time Test Method
Apparatus and Reagents Analytical balances accurate to 0.0001 gram. Each bank of 4 balances is interfaced with a computer that utilizes Labview data acquisition software for collecting test data Built-in draft shield on the balance is used to minimize drafts, with only the top open to allow for drying. Vertical specimen stand is 3 inches wide and 6 inches tall.

Sampling and Specimens

For a typical test four 2.5×2.5 inch square specimens are used. Two of the specimens are the "control" (reference) fabric and two are from the "test" fabric of interest. More specimens can be used to increase testing accuracy.

Conditioning

Samples are conditioned in the conditioning room at temperature of 70° F. and 55% relative humidity for at least 4 hours prior to test.

Procedures

Option B: Saturated. (note: This is essentially the Natick sample preparation protocol)
1. Weigh the conditioned sample using a laboratory balance, accurate to 0.0001 g.
2. Place 10 mL of distilled water into a 25 ml beaker.
3. Submerge one specimen in the beaker for 5-10 minutes. Make certain that the specimen is completely submerged under the water to insure complete wetting.
4. Remove specimen from the beaker and sandwich it between two pieced of unused AATCC blotter paper and pass it through the wringer. Leave the piece sandwiched in the wet blotters. Repeat this process for the remaining specimens of the same sample.
5. Tare the vertical specimen stand on the balance position to be used for that specimen.
6. Mount the blotted specimen on the vertical stand and then place it on the balance. Record the wet weight of the blotted specimen.
7. Start the test by initiating data acquisition on the LabView software. Weight readings are automatically recorded every 15 seconds by the computer.

The test is complete once the specimen weight has reached a designated stopping moisture level vs. the dry conditioned weight. The stopping moisture level is typically 1% to 2.5% for cotton blend & cotton fabrics and 0.5% for polyester. The test is ended by stopping data acquisition in LabView.

Calculation and Interpretation

Total drying time is the time it takes the specimen to reach the stopping weight.

Total water release rate ("WRR," g/min) is calculated as follows:

$$\text{Total WRR} = (\text{wet specimen weight} - \text{ending specimen weight})/(\text{total drying time})$$

$\Delta$WRR, total (%) is calculated from the respective total WRR values as follows:

$$\Delta WRR_{total} = 100 \times (WRR_{test} - WRR_{control})/WRR_{control}$$

"Comfort Zone" drying time (minutes) is the time it takes the specimen's moisture content to decrease from 15% to 0.5% (polyester) or 20% to 1-1.5% (cotton).

"Comfort Zone" WRR (g/min) is calculated as follows:

$$\text{Active WRR} = (\text{wet specimen weight} - \text{ending specimen weight})/(\text{"active" drying time})$$

$\Delta$WRR (Comfort Zone) is calculated in the same manner as for $\Delta$WRR(total) except using test and control WRR (Comfort Zone) values.

Moisture Vapor Transmission Test

ASTM E96 is used to measure moisture vapor transmission. A 4"×4" fabric specimen is prepared. A cup is filled with distilled water leaving a small gap (0.75" to 0.25") of air space between the specimen and the water. The cup is then sealed to prevent vapor loss except through the test sample. An initial weight is taken of the apparatus and then periodically weighed over time until results become linear.

Example 1

The Air Force tiger stripe print base fabric is twill fabric with diagonal weave (7.6 oz./sq. yd.) prepared from yarn of an intimate fiber blend of 50% Protex® M modacrylic fiber/ 30% Pima cotton/10% nylon/10% Twaron® para-aramid.

Heat and Thermal Shrinkage Resistance

Six fabric specimens (3 samples as received; 3 samples after three wash cycles) were tested in accordance with NFPA 1971 (which is equivalent to the standards set forth in NFPA 2112 and NFPA 1975) to measure heat and thermal shrinkage resistance, carried out at 500° F. for a test exposure time of 5 minutes.

Results:

All specimens were not charred after exposure to heat.

As received:

% loss of length (2.5, 2.5, 2.5)

% loss of width (2.5, 2.5, 2.5)

After 3× washes

% loss of length (2.0, 2.0, 2.0)

% loss of width (2.0, 2.0, 2.0)

Flame Resistance of Textiles (Vertical)

Five fabric specimens were tested, as received, in accordance with ASTM D6413 to measure flame resistance. The test results are shown in the table below:

|  | After-Flame (seconds) | After-Glow (seconds) | Melting Drip (seconds) | Char Length (mm) |
|---|---|---|---|---|
| Length Direction | | | | |
| Sample 1 | 0.0 | 4.0 | 0.0 | 11062 |
| Sample 2 | 0.0 | 6.0 | 0.0 | 10567 |
| Sample 3 | 0.0 | 4.0 | 0.0 | 8277 |
| Sample 4 | 0.0 | 6.0 | 0.0 | 12971 |
| Sample 5 | 0.0 | 6.0 | 0.0 | 10682 |
| Average | 0.0 | 5.2 | 0.0 | 106.471.8 |
| Width Direction | | | | |
| Sample 1 | 0.0 | 5.06.0 | 0.0 | 10177 |
| Sample 2 | 0.0 | 4.05.0 | 0.0 | 9181 |
| Sample 3 | 0.0 | 7.05.0 | 0.0 | 9781 |
| Sample 4 | 0.0 | 5.04.0 | 0.0 | 9563 |
| Sample 5 | 0.0 | 6.05.0 | 0.0 | 11382 |
| Average | 0.0 | 5.45.0 | 0.0 | 99.476.8 |

After 25 Washing

|  | After-Flame (seconds) | After-Glow (seconds) | Melting Drip (seconds) | Char Length (mm) |
|---|---|---|---|---|
| Length Direction | | | | |
| Sample 1 | 5.0 | 5.0 | 0.0 | 85 |
| Sample 2 | 6.0 | 5.0 | 0.0 | 99 |
| Sample 3 | 5.0 | 5.0 | 0.0 | 112 |
| Sample 4 | 4.0 | 7.0 | 0.0 | 110 |
| Sample 5 | 4.0 | 6.0 | 0.0 | 82 |
| Average | 4.8 | 5.6 | 0.0 | 97.6 |
| Width Direction | | | | |
| Sample 1 | 5.0 | 6.0 | 0.0 | 82 |
| Sample 2 | 3.0 | 5.0 | 0.0 | 102 |
| Sample 3 | 6.0 | 5.0 | 0.0 | 110 |
| Sample 4 | 5.0 | 4.0 | 0.0 | 80 |
| Sample 5 | 5.0 | 5.0 | 0.0 | 97 |
| Average | 4.8 | 5.0 | 0.0 | 94.2 |
| ASTM F1506 Requirements | | | | |
| | 2.0 seconds (maximum) | | None | 152 mm (maximum) |

Example 2

The Air Force tiger stripe print base fabric, a twill fabric with diagonal weave (7.58 oz./sq. yd.), was prepared from yarn of an intimate fiber blend of 50% Protex® C modacrylic fiber/30% Pima cotton/10% nylon/10% Twaron® para-aramid.

Heat and Thermal Shrinkage Resistance

Six fabric specimens (3 samples as received; 3 samples after three wash cycles) were tested in accordance with NFPA 1971 to measure heat and thermal shrinkage resistance, carried out at 500° F. for a test exposure time of 5 minutes.

Results:

All specimens were not charred after exposure to heat.

As received:

% loss of length (2.5, 2.5, 2.5)

% loss of width (2.5, 2.5, 2.5)

After 3× washes

% loss of length (2.0, 2.0, 2.0)

% loss of width (2.0, 2.0, 2.0)

Air Permeability

The sample was tested for air permeability in accordance with ASTM-D737. The resulting measured air permeability is 20.1 foot$^3$/minute/foot$^2$.

Water Vapor Transmission

The sample was tested for water vapor transmission in accordance with ASTM E96 Procedure B (water method, 74.5° F., 48% relative humidity; air gap $^{11}/_{16}$"). The resulting transmission rate measured was 1255.0 g/m$^2$/24 hour average.

Moisture Wicking

The results of the 1" strip moisture wicking at 70° F., 65% relative humidity are shown in the table below.

|  | Height of Wicking (cm) | |
|---|---|---|
| Time (seconds) | Length | Width |
| 30 | 3.8 | 3.0 |
| 60 | 5.0 | 4.3 |
| 90 | 6.0 | 5.2 |
| 120 | 6.7 | 5.9 |
| 150 | 7.3 | 6.6 |
| 180 | 7.9 | 7.1 |
| 210 | 8.3 | 7.5 |
| 240 | 8.9 | 7.9 |
| 270 | 9.2 | 8.3 |
| 300 | 9.5 | 8.6 |

Drying Test

Three 2"×2" samples were cut from the test fabrics and conditioned until a constant mass was reached. The conditioning cabinet used was an ESPEC with forced air circulation (0.4 m/s average) and set at constant temperature of 70° F.+/−1° F. and humidity 65%+/−3%. Samples were wetted with deionized water to a water pick-up of approximately 65%. Samples were then weighted every 5 minutes under constant conditions until the original mass was reached to approximately 1%. Baseline evaporation of standing water in the cabinet was measured to be 0.043 g/5 minutes on average. The results are shown in the following table.

| Time (minutes) | Wet Pick-up (%) |
| --- | --- |
| 0 | 45.3 |
| 5 | 40.79 |
| 10 | 34.74 |
| 15 | 29.81 |
| 20 | 23.74 |
| 25 | 18.68 |
| 30 | 13.69 |
| 35 | 8.75 |
| 40 | 4.69 |
| 45 | 2.33 |
| 50 | 1.33 |
| 55 | 0.71 |
| 60 | 0.00 |

Thermal and Water Vapor Resistance

Thermal and water vapor resistance under steady conditions guarded hot plate test in accordance with ISO 11092 were measured. The intrinsic insulation measured was 0.13

Example 3

A rip stop woven fabric (5.75 oz./sq. yd.) was prepared from a yarn of an intimate fiber blend of 41% modacrylic/30% cotton/27% para-aramid/2% antistatic carbon fiber. The woven fabric was tested and the results are shown in the following table.

| Test Description | Test Method | Target | Minimum | Maximum | Results |
| --- | --- | --- | --- | --- | --- |
| Weight (oz/yd$^2$) | ASTM D3776 | 5.75 | −5% | +5% | 5.84 |
| Breaking strength | ASTM D5034 | 150 × 110 | 100 × 60 | | 152 × 115 |
| Tear strength (Elmendorf) | ASTM D1424 | 8 × 8 | 6 × 6 | | 7.4 × 7.6 |
| Air permeability | ASTM D737 | 35 | 25 | 50 | 37.6 |
| Initial flammability (Wales/Courses) | ASTM D6413-99 | | | | |
| Char length (inches) | | 5.0" maximum | 4 | 5 | 3.6 × 3.6 |
| After flame (seconds) | | 2.0 seconds maximum | 0 | 2 | 0 |
| After glow (seconds) | | 8.0 seconds maximum | 5 | 8 | 4.7 × 5.2 |
| Melt/drip | | None | None | | None |
| Thermal protective performance (no spacers) Initial | NFPA 1971 | 7.4 (initial) | | | 7.4 |
| Flame resistance (Instrumented mannequin test) 4 seconds flame exposure | ASTM F 1930-2000 (% burn - 2$^{nd}$ and 3$^{rd}$ degree) | <35% | | 35% | 34.69% |

Example 4

A woven twill fabric (7.6 oz./sq. yd.) was prepared from a yarn of an intimate fiber blend of 50% modacrylic/30% cotton/10% nylon/10% para-aramid. The woven twill fabric was tested and the results are shown in the following table.

| Test Description | Test Method | Target | Minimum | Maximum | Results |
| --- | --- | --- | --- | --- | --- |
| Weight (oz/yd$^2$) | ASTM D3776 | 7.5 | −5% | +5% | 7.58 |
| Breaking strength | ASTM D5034 | 115 × 75 | 100 × 60 | | 115.7 × 75 |
| Tear strength (Elmendorf) | ASTM D1424 | 3 × 5 | 6 × 6 | | 2.96 × 4.64 |
| Air permeability | ASTM D737 | 20 | 15 | 25 | 20.1 |
| Initial flammability (Wales/Courses) | ASTM D6413-99 | | | | |
| Char length (inches) | | 5.0" maximum | 4 | 5 | 4.18 × 3.9 |
| After flame (seconds) | | 2.0 seconds maximum | 0 | 2 | 0 |
| After glow (seconds) | | 8.0 seconds maximum | 5 | 8 | 5.2 × 5.4 |
| Melt/drip | | None | None | | None |
| Flammability after 25 washes/dry cleaning (Wales/Courses) | ASTM D6413-99 after 25 home laundering w/d cycles | | | | |
| Char length (inches) | | 4.0" maximum | 4 | 5 | 3.8 × 3.7 |

-continued

| Test Description | Test Method | Target | Minimum | Maximum | Results |
|---|---|---|---|---|---|
| After flame (seconds) | 2.0 seconds maximum | 0 | | 2 | 0 |
| After glow (seconds) | 8.0 seconds maximum | 5 | | 8 | 4.8 × 4.8 |
| Melt/drip | None | None | | | None |
| Heat and thermal shrinkage resistance | NFPA 1971.2000 ed | Pass | | | Pass |
| Thermal protective performance (no spacers) | NFPA 1971 | | | | |
| Initial | | 5.7 | | | 5.7 |
| After 3x washing | | 6.7 | | | 6.7 |
| Clo Factor | ISO 11092 (under steady state conditions) | 0.13 | | | 0.13 |
| Flame resistance (Instrumented mannequin test) 4 seconds flame exposure | ASTM F 1930-2000 (% burn - $2^{nd}$ and $3^{rd}$ degree) | 15% | | 25% | 19.30% |

Comparative Example 5

Navy colored, knitted fabric formed from a fiber blend of 83% modacrylic/15% cotton/2% TWARON™ para-aramid was tested in accordance with NFPA 1975 (equivalent to NFPA 1971 and NFPA 2112) (heat and thermal shrinkage resistance for station/work uniforms for fire and emergency services) (test temperature: 500° F.; test exposure time: 5 minutes). Three samples were tested. Immediately after exposure specified, the specimens were removed and examined for evidence of charring, embrittlement, ignition (i.e., initiation of combustion, as set forth in ASTM D6413 flame resistance of textiles), melting and dripping or separation. Knit fabrics were pulled to original dimensions and allowed to relax for five minutes prior to measurement to determine pass or fail.

Results:

All three samples failed, when evaluated after heat at 500° F. All samples exhibited smoldering, i.e., the combustion of a solid material without accompaniment of flame but generally with the production of smoke (as set forth in ASTM D6413 flame resistance of textiles). All samples remained charred and brittle after exposure to heat. The samples could not be exercised and re-measured for shrinkage.

Comparative Example 6

Green colored, knitted fabric formed from a fiber blend of 80% PROTEX™ modacrylic/15% cotton/5% TWARON™ para-aramid was tested in accordance with NFPA 1975 (heat and thermal shrinkage resistance for station/work uniforms for fire and emergency services) (test temperature: 500° F.; test exposure time: 5 minutes). Three samples were tested. Immediately after exposure specified, the specimens were removed and examined for evidence of charring, embrittlement, ignition (i.e., initiation of combustion, as set forth in ASTM D6413 flame resistance of textiles), melting and dripping or separation. Knit fabrics were pulled to original dimensions and allowed to relax for five minutes prior to measurement to determine pass or fail.

Results:

All three samples failed, when evaluated after heat at 500° F. All samples exhibited smoldering, i.e., the combustion of a solid material without accompaniment of flame but generally with the production of smoke (as set forth in ASTM D6413 flame resistance of textiles). All samples remained charred and brittle after exposure to heat. The samples could not be exercised and re-measured for shrinkage.

Comparative Example 7

Green colored, knitted fabric formed from a fiber blend of 75% PROTEX C™ modacrylic/15% Pima cotton/10% BASOFIL™ melamine fiber was tested in accordance with NFPA 1975 (heat and thermal shrinkage resistance for station/work uniforms for fire and emergency services) (test temperature: 500° F.; test exposure time: 5 minutes). Three samples were tested. Immediately after exposure specified, the specimens were removed and examined for evidence of charring, embrittlement, ignition (i.e., initiation of combustion, as set forth in ASTM D6413 flame resistance of textiles), melting and dripping or separation. Knit fabrics were pulled to original dimensions and allowed to relax for five minutes prior to measurement to determine pass or fail.

Results:

All three samples failed, when evaluated after heat at 500° F. All samples exhibited smoldering, i.e., the combustion of a solid material without accompaniment of flame but generally with the production of smoke (as set forth in ASTM D6413 flame resistance of textiles). All samples remained charred and brittle after exposure to heat. The samples could not be exercised and re-measured for shrinkage.

Comparative Example 8

Green colored, knitted fabric formed from a fiber blend of 80% PROTEX C™ modacrylic/15% Pima cotton/5% BASOFIL™ melamine fiber was tested in accordance with NFPA 1975 (heat and thermal shrinkage resistance for station/work uniforms for fire and emergency services) (test temperature: 500° F.; test exposure time: 5 minutes). Three samples were tested. Immediately after exposure specified, the specimens were removed and examined for evidence of charring, embrittlement, ignition (i.e., initiation of combustion, as set forth in ASTM D6413 flame resistance of textiles), melting and dripping or separation. Knit fabrics were pulled to original dimensions and allowed to relax for five minutes prior to measurement to determine pass or fail.

Results:

All three samples failed, when evaluated after heat at 500° F. All samples exhibited smoldering, i.e., the combustion of a solid material without accompaniment of flame but generally with the production of smoke (as set forth in ASTM D6413 flame resistance of textiles). All samples remained charred and brittle after exposure to heat. The samples could not be exercised and re-measured for shrinkage.

Comparative Example 9

Green colored, knitted fabric formed from a fiber blend of 85% PROTEX C™ modacrylic/15% cotton was tested in accordance with NFPA 1975 (heat and thermal shrinkage resistance for station/work uniforms for fire and emergency services) (test temperature: 500° F.; test exposure time: 5 minutes). Three samples were tested. Immediately after exposure specified, the specimens were removed and examined for evidence of charring, embrittlement, ignition (i.e., initiation of combustion, as set forth in ASTM D6413 flame resistance of textiles), melting and dripping or separation.

Knit fabrics were pulled to original dimensions and allowed to relax for five minutes prior to measurement to determine pass or fail.

Results:

All three samples failed, when evaluated after heat at 500° F. All samples exhibited smoldering, i.e., the combustion of a solid material without accompaniment of flame but generally with the production of smoke (as set forth in ASTM D6413 flame resistance of textiles). All samples remained charred and brittle after exposure to heat. The samples could not be exercised and re-measured for shrinkage.

Comparative Example 10

Knitted fabric formed from a fiber blend of 75% PROTEX™ modacrylic/25% cotton was tested in accordance with NFPA 1971-07 (heat and thermal shrinkage resistance test; modified to use 7 inch specimens with 5 inch benchmarks). Three samples were tested as received. Immediately after exposure specified, the specimens were removed and examined for evidence of melting, dripping or separation, or ignition (i.e., initiation of combustion, as set forth in ASTM D6413 flame resistance of textiles).

Results:

There was no melting, dripping, separation, or ignition of any of the samples. The samples exhibited severe color change. The dimension stability measurements were difficult to obtain due to the material gathering into small wrinkles and folds.

|  | Sample 1 | Sample 2 | Sample 3 | Average | Pass/fail |
|---|---|---|---|---|---|
| Length | −40.0 | −35.0 | −35.0 | −36.7 | Fail |
| Width | −67.0 | −67.6 | −65.0 | −66.5 | Fail |

Example 11

When two examples of the invention were compared with a comparative blend outside of the invention, the benefits of faster overall drying are clear, when tested in accordance with AATCC MM TS-05 Gravimetric Drying Test Modified. The results are shown in the table below.

| Fiber Blend Content | Weight (oz/yd$^2$) | Wet Pick-Up | Total dry time (total - 1.5% moisture) | Dry time in comfort zone (20-1.5% moisture) | WRR (Total - 1.5% moisture) | WRR in comfort zone (20-1.5% moisture) |
|---|---|---|---|---|---|---|
| DRIFIRE ® Example A 50% modacrylic/30% cotton/10% nylon/10% para-aramid | 7.8 | 31.6 | 57.5 | 41.9 | 0.54 | 0.47 |
| DRIFIRE Example B 40% modacrylic/31% cotton/ 27% para-aramid/2% antistat | 5.9 | 30.3% | 63.1 | 48.3 | 0.47 | 0.40 |
| Competitive Example C 65% FR rayon/ 25% para-aramid/10% nylon | 6.0 | 31.0% | 66.6 | 54.5 | 0.46 | 0.36 |

Even a much heavier weight DRIFIRE® Example A (7.8 osy fabric) can absorb the same percentage of weight of water (2.45 oz of water) as the Comparative Example C 6.0 osy (1.82 oz of water) yet still dry faster (DRIFIRE Example A dried in 57.5 minutes versus 66.6 minutes for the Comparative Example C), which results in a higher overall water release rate. When these same fabrics are tested from a more realistic 20% by weight to 1.5% remaining moisture the blends of the invention provide the wearers with improved comfort and ability to keep the body cool by moving heat-containing sweat away from the skin, into the fabric, and drying more rapidly than the comparative blend.

Example 12

When two examples of the invention were compared with a comparative blend outside of the invention, the benefits of improved dry and wet abrasion are apparent, when tested in accordance with ASTM D 4966. The results are shown in the table below.

| Fiber Blend Content | Dry Abrasion Resistance (ASTM D 4966) | Number of Abrasion cycles to develop a hole in the fabric | Wet Abrasion Resistance (ASTM D 4966) | Number of Abrasion cycles to develop a hole in the fabric |
|---|---|---|---|---|
| 7.8 osy DRIFIRE ® Example A 50% modacrylic/30% cotton/10% nylon/ 10% para-aramid | 0.00% | 14000+ | 0.76% | 9000-10000 |
| 5.9 osy DRIFIRE Example B 40% modacrylic/31% cotton/27% para-aramid/2% antistat | 0.33% | 11000-12000 | 0.66% | 5000-6000 |
| 6.0 osy Comparative Example C 65% FR rayon/ 25% para-aramid/10% nylon | 0.64% | 4000-5000 | 1.90% | 3000-4000 |

Abrasion of the fabric can lead to a reduction weight, thickness, and eventually the failure of the fabric with a hole forming which exposes the wearer directly to an electric arc or fire threat. Having fabrics made of improved abrasion resistance yarns can result in longer lasting protective garments. These improved blends provide improved moisture management (water release rate) without sacrificing dry and wet abrasion resistance.

Example 13

A khaki-colored plain woven fabric (5.75 oz./sq. yd.) was prepared from a yarn of an intimate fiber blend of 40% modacrylic/31% cotton/27% para-aramid/2% antistat. The plain woven fabric was tested and the results are shown in the following table.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A fiber blend, comprising:
about 30-70%, by weight, based on the total weight of the fiber blend, of a hydrophobic fiber component comprising at least one polymer selected from the group con-

| Test Description | Test Method | Results |
|---|---|---|
| Weight (oz/yd$^2$) | ASTM D3776 | 5.82 |
| Tensile | ASTM D5034 | Warp 142.2 lbs. average |
| | | Filling 117.9 lbs average |
| Tear strength (Elmendorf) | ASTM D1424 | 7.20 lbs. average |
| | | 4.74 lbs. average |
| Seam slippage | ASTM D434 | Warp direction: 45.9 lbs. average seam break |
| | | Filling direction: 50.4 lbs. average seam break |
| Thermal protective performance | NFPA 2112 | Heat transfer rate with spacer (as received): 12.1 cal/cm$^2$/sec |
| | | Heat transfer rate after 3 × machine washing with spacer: 12.4 cal/cm$^2$/sec |
| | | Heat transfer rate without spacer (as received): 13.4 cal/cm$^2$/sec |
| | | Heat transfer rate after 3 × machine washing without spacer: 12.5 cal/cm$^2$/sec |
| Heat and thermal shrinkage resistance | Test temperature: 500° F. Test exposure time: 5 minutes | Dimensional change (as received): wales = +2%; courses = −0.2% (pass) |
| | | Dimensional change (after 3 × washings)): wales = +1.9%; courses = +0.6% (pass) |
| Flame resistance of textiles (vertical) | ASTM D6413 | See below |
| Char length (inches) | ASTM D6413 | As received: length: 113.3 mm; width: 102.9 |
| | | 100x per NFPA2112: length: 125.4 mm; width: 106.2 |
| After flame (seconds) | ASTM D6413 | As received: length: 0 seconds; width: 0 seconds |
| | | 100x per NFPA2112: length: 0 seconds; width: 0 seconds |
| After glow (seconds) | ASTM D6413 | As received: length: 6.9 seconds; width: 6.8 seconds |
| | | 100x per NFPA2112: length: 10.3 seconds; width: 11.1 seconds |
| Melt/drip | ASTM D6413 | As received: none |
| | | 100x per NFPA2112: length: none | sisting of modacrylic, fluoropolymer, polybenzimidazole (PBI), and copolymers thereof, and combinations thereof;

about 15-45%, by weight, based on the total weight of the fiber blend, of a hydrophilic fiber component comprising at least one polymer selected from the group consisting of cellulose, cellulose derivatives, wool, and copolymers thereof, and combinations thereof;

about 10-30%, by weight, based on the total weight of the fiber blend, of at least one structural fiber component comprising at least one polymer selected from the group consisting of aramid fiber, melamine fiber, nylon fiber, structural carbon fiber, and combinations thereof; wherein said aramid fiber is present at a level of at least about 10%, by weight, based on the total weight of the fiber blend; and about 0.1-3% by weight, based on the total weight of the fiber blend, of at least one antistatic fiber.

2. A fiber blend of claim 1,
wherein, when said fiber blend is formed into a fabric formed substantially of said fiber blend, said fabric provides protection against second and third degree burns on less than about 35% of the wearer, when tested in accordance with the American Society for Testing and Materials Standard Test ASTM F 1930-2000.

3. A fiber blend of claim 1,
wherein, when said fiber blend is formed into a fabric formed substantially of said fiber blend, said fabric has a char length less than about 5 inches, when tested in accordance with the American Society for Testing and Materials Standard Test ASTM 6413.

4. A fiber blend of claim 1,
wherein, when said fiber blend is formed into a fabric formed substantially of said fiber blend, said fabric has a water vapor transmission of at least about 1100, when tested in accordance with the American Society for Testing and Materials Standard Test ASTM E96 for Water Vapor Transmission, and a vertical wicking of at least about 6 cm/5 minutes, when tested in accordance with Natick Internal Method No. 4.

5. A fiber blend of claim 1,
wherein, when said fiber blend is formed into a fabric formed substantially of said fiber blend, said fabric has a wet tear value of at least equal to or greater than a corresponding dry tear value, when tested in accordance with the American Society for Testing and Materials Standard Test ASTM D 1424 (condition 1 dry; condition 2 wet).

6. A fiber blend of claim 1,
wherein, when said fiber blend is formed into a fabric formed substantially of said fiber blend, said fabric has a wet abrasion resistance of greater than about 4000 random abrasion cycles with a 9 KPa load, and greater than about 5,000 dry random abrasion cycles with a 9 KPa load using wet/dry 600 grit ultrafine sandpaper to simulate field usage, when tested in accordance with American Society for Testing and Materials Standard Test ASTM D 4966 Abrasion Resistance of Textile Fabrics—Martindale Abrasion Test Method.

7. A fiber blend of claim 1,
wherein, when said fiber blend is formed into a fabric formed substantially of said fiber blend, said fabric has a heat and thermal shrinkage resistance value of less than about 5%, when tested in accordance with the National Fire Prevention Association NFPA 1971 and a thermal protective performance value of at least about 5, when tested in accordance with the National Fire Prevention Association NFPA 1971 (without spacer).

8. A fiber blend of claim 1,
wherein said hydrophobic fiber component is present at about 40-60%, by weight, based on the total weight of the fiber blend.

9. A fiber blend of claim 1,
wherein said hydrophobic fiber component is present at about 40-50%, by weight, based on the total weight of the fiber blend.

10. A fiber blend of claim 1,
wherein said hydrophilic fiber component is present at about 25-35%, by weight, based on the total weight of the fiber blend.

11. A fiber blend of claim 1,
wherein said hydrophilic fiber component is present at about 25-30%, by weight, based on the total weight of the fiber blend.

12. A fiber blend of claim 1,
wherein said structural fiber component is present at about 20-30%, by weight, based on the total weight of the fiber blend.

13. A fiber blend of claim 1,
wherein said structural fiber component is present at about 25-30%, by weight, based on the total weight of the fiber blend.

14. A fiber blend of claim 1,
wherein said hydrophobic fiber component is modacrylic or copolymer thereof.

15. A fiber blend of claim 1,
wherein said fluoropolymer is polytetrafluoroethylene (PTFE), perfluoroalkoxy polymer (PFA), or fluorinated ethylene-propylene (FEP).

16. A fiber blend of claim 1,
wherein said cellulose derivative is cotton, viscose, linen, rayon, or a combination thereof.

17. A fiber blend of claim 1,
wherein said hydrophilic fiber component is cotton.

18. A fiber blend of claim 1,
wherein said structural fiber component is aramid fiber.

19. A fiber blend of claim 18,
wherein said aramid fiber is m-aramid polymer or p-aramid polymer.

20. A fiber blend of claim 1,
wherein said hydrophobic fiber component is modacrylic or a copolymer thereof;
wherein said hydrophilic fiber component is cellulose or a cellulose derivative, or a combinations thereof; and
wherein said structural fiber component is aramid fiber, nylon fiber, or a combination thereof.

21. A fiber blend, comprising:
about 30-41%, by weight, based on the total weight of the fiber blend, of modacrylic and copolymers thereof;
about 30-41%, by weight, based on the total weight of the fiber blend, of cotton;
about 27-30%, by weight, based on the total weight of the fiber blend, of para-aramid fiber; and
about 2%, by weight, based on the total weight of the fiber blend, of an antistatic carbon fiber.

22. A yarn comprising the fiber blend of claim 1,
wherein said hydrophobic fiber component, said hydrophilic fiber component, said structural fiber component, and said antistatic fiber are intimately blended.

23. A fabric comprising the yarn of claim 22.

24. A fabric of claim 23,
wherein said fabric is formed substantially of said fiber blend and wherein said fabric provides protection against second and third degree burns on less than about 35% of the wearer, when tested in accordance with the American Society for Testing and Materials Standard Test ASTM F 1930-2000.

25. A fabric of claim 23, wherein said fabric is formed substantially of said fiber blend and wherein said fabric has a char length less than about 5 inches, when tested in accordance with the American Society for Testing and Materials Standard Test ASTM 6413.

26. A fabric of claim 23, wherein said fabric has a water vapor transmission of at least about 1100, when tested in accordance with the American Society for Testing and Materials Standard Test ASTM E96 for Water Vapor Transmission, and a vertical wicking of at least about 6 cm/5 minutes, when tested in accordance with Natick Internal Method No. 4.

27. A fabric of claim 23, wherein said fabric is formed substantially of said fiber blend and wherein said fabric has a wet tear value of at least equal to or greater than a corresponding dry tear value, when tested in accordance with the American Society for Testing and Materials Standard Test ASTM D 1424 (condition 1 dry; condition 2 wet).

28. A fabric of claim 23, wherein said fabric is formed substantially of said fiber blend and wherein said fabric has a wet abrasion resistance of greater than about 4000 random abrasion cycles with a 9 KPa load, and greater than about 5,000 dry random abrasion cycles with a 9 KPa load using wet/dry 600 grit ultrafine sandpaper to simulate field usage, when tested in accordance with American Society for Testing and Materials Standard Test ASTM D 4966 Abrasion Resistance of Textile Fabrics—Martindale Abrasion Test Method.

29. A fabric of claim 23, wherein said fabric has a heat and thermal shrinkage resistance value of less than about 5%, when tested in accordance with the National Fire Prevention Association NFPA 1971 and a thermal protective performance value of at least about 5, when tested in accordance with the National Fire Prevention Association NFPA 1971 (without spacer).

30. A fabric of claim 23, wherein said fabric has a basis weight of less than about 8.0 ounces/square yard (OPSY).

31. A fabric of claim 23, wherein said fabric has a basis weight of less than about 6.0 ounces/square yard (OPSY).

32. A fabric of claim 23, wherein said fabric is woven.

33. A fabric of claim 23, wherein said fabric is knitted.

34. A garment comprising the fabric of claim 23.

35. A garment of claim 34, wherein said fabric forms at least one outer portion of said garment.

36. A garment of claim 34, wherein said garment is outerwear.

37. A garment of claim 36, wherein said outerwear is a coat, coverall, overall, shirt, or pants.

38. A garment of claim 37, wherein said outerwear is a firefighter turnout coat.

* * * * *